(12) United States Patent
Park et al.

(10) Patent No.: US 11,175,308 B2
(45) Date of Patent: Nov. 16, 2021

(54) CHIP CARRIER EXCHANGING DEVICE AND ATOMIC FORCE MICROSCOPY APPARATUS HAVING SAME

(71) Applicant: PARK SYSTEMS CORP., Gyeonggi-do (KR)

(72) Inventors: Sang-il Park, Gyeonggi-do (KR); Yonghan Lee, Gyeonggi-do (KR); Ahjin Jo, Seoul (KR)

(73) Assignee: PARK SYSTEMS CORP., Gyeonggi-Do (KR)

( * ) Notice: Subject to any disclaimer, the term of this patent is extended or adjusted under 35 U.S.C. 154(b) by 0 days.

(21) Appl. No.: 16/897,091

(22) Filed: Jun. 9, 2020

(65) Prior Publication Data
US 2020/0386784 A1 Dec. 10, 2020

(30) Foreign Application Priority Data
Jun. 10, 2019 (KR) .......................... 10-2019-0067896

(51) Int. Cl.
*G01Q 70/02* (2010.01)
*G01Q 60/38* (2010.01)

(52) U.S. Cl.
CPC ............. *G01Q 70/02* (2013.01); *G01Q 60/38* (2013.01)

(58) Field of Classification Search
CPC .................................................... G01Q 70/02
See application file for complete search history.

(56) References Cited

U.S. PATENT DOCUMENTS

| 5,705,814 A | 1/1998 | Young et al. | |
| 5,756,887 A * | 5/1998 | Bryson, III | ............ G01Q 70/02 73/105 |
| 2010/0037360 A1* | 2/2010 | Jo | .......................... G01Q 70/02 850/53 |
| 2017/0067935 A1* | 3/2017 | Gomez-Casado | ..... G01Q 70/02 |

FOREIGN PATENT DOCUMENTS

| JP | 2002323430 A | 11/2002 |
| JP | 2007271358 A | 10/2007 |
| KR | 100825985 B1 | 4/2008 |
| KR | 1020170022932 A | 3/2017 |

* cited by examiner

*Primary Examiner* — Eliza W Osenbaugh-Stewart
(74) *Attorney, Agent, or Firm* — AEON Law, PLLC; Adam L. K. Philipp; Shan Liao (57) ABSTRACT

A chip carrier exchanging device receives a used chip carrier from a head of a scanning probe microscope that performs measurement by using the chip carrier configured such that a measurement means is attached to a carrier made of a magnetic material, and the chip carrier exchanging device supplies a new chip carrier to the head. The chip carrier exchanging device includes: a permanent magnet; a magnetism flow connecting unit made of a magnetic material that allow magnetism to flow therethrough, the magnetism flow connecting unit being configured to fix the chip carrier by exerting a magnetic effect on the carrier; and a drive unit configured to operate the permanent magnet to change magnetic force between the carrier and the magnetism flow connecting unit.

8 Claims, 7 Drawing Sheets

CHIP CARRIER EXCHANGING DEVICE AND ATOMIC FORCE MICROSCOPY APPARATUS HAVING SAME

CROSS-REFERENCE TO RELATED APPLICATIONS

This application claims the priority of Korean Patent Application No. 10-2019-0067896 filed on Jun. 10, 2019, in the Korean Intellectual Property Office, the disclosure of which is incorporated herein by reference.

BACKGROUND

Field

The present disclosure relates to a chip carrier exchanging device and an atomic force microscopy apparatus including the same, and more particularly, to a chip carrier exchanging device capable of storing chip carriers, supplying the chip carrier to an atomic force microscope, and receiving the used chip carrier, and an atomic force microscopy apparatus including the chip carrier exchanging device.

Description of the Related Art

A scanning probe microscope (SPM) refers to a microscope that measures properties of a surface of a sample and shows the properties in 3D images while allowing a fine probe, which is manufactured by a MEMS process or the like, to scan the surface of the sample. Based on a measurement method, such a scanning probe microscope may be classified into an atomic force microscope (AFM), a scanning tunneling microscope (STM), and the like.

Probes are produced by various manufacturers, and these probes are used for apparatuses manufactured by the manufacturers that produce various scanning probe microscopes. The manufacturers of the scanning probe microscopes need to mount the probes on the apparatuses in order to utilize the probes. Because various probes need to be used even for a single apparatus, carriers are used to mount the probes on the microscope. That is, the probe is not directly mounted on the scanning probe microscope, but the probe is attached to the carrier and the carrier is fixed to the scanning probe microscope, such that the probe may be utilized for measurement.

Meanwhile, the probe is a consumable component that is abraded during the measurement process and thus needs to be replaced. The probe, together with the carrier, needs to be replaced when a predetermined amount of time elapses or image quality deteriorates to a predetermined degree. In general, the probes are exchanged manually.

However, because the exchange of the probes causes inefficiency in the automated microscope apparatus, there is a consistent need for automation of the process of exchanging the probes in the industries.

Accordingly, the present applicant has developed an automated method of exchanging probes (mode name: ATX (Auto Tip Exchanger™), filed a patent application, and obtained a patent right (see Patent Document 1).

(Patent Document 1)
Korean Patent No. 10-0825985 (entitled Scanning Probe Microscope Capable of Auto Probe Exchange Function)

SUMMARY

The present disclosure has been made in an effort to improve the aforementioned previous research, and an object of the present disclosure is to provide a chip carrier exchanging device capable of storing chip carriers, supplying the chip carrier to an atomic force microscope, and receiving the used chip carrier, and an atomic force microscopy apparatus including the chip carrier exchanging device.

Technical problems of the present disclosure are not limited to the aforementioned technical problems, and other technical problems, which are not mentioned above, may be clearly understood by those skilled in the art from the following descriptions.

In order to solve the aforementioned object, the chip carrier exchanging device according to one exemplary embodiment of the present disclosure receives a used chip carrier from a head of a scanning probe microscope that performs measurement by using the chip carrier configured such that a measurement means is attached to a carrier made of a magnetic material, and the chip carrier exchanging device supplies a new chip carrier to the head. The chip carrier exchanging device includes: a permanent magnet; a magnetism flow connecting unit made of a magnetic material that allow magnetism to flow therethrough, the magnetism flow connecting unit being configured to fix the chip carrier by exerting a magnetic effect on the carrier; and a drive unit configured to operate the permanent magnet to change magnetic force between the carrier and the magnetism flow connecting unit.

According to another feature of the present disclosure, the drive unit may be configured to rectilinearly operate the permanent magnet so that the permanent magnet moves away from or close to the magnetism flow connecting unit.

According to still another feature of the present disclosure, the plurality of magnetism flow connecting units and the plurality of permanent magnets may be disposed, and the drive unit may be configured to rectilinearly operate the permanent magnets in a direction in which the magnetism flow connecting units are disposed.

According to yet another feature of the present disclosure, the drive unit may be controlled such that the permanent magnets are rectilinearly operated between an ON state in which the permanent magnets face the magnetism flow connecting units and an OFF state in which the permanent magnets are most distant from the magnetism flow connecting units.

According to still yet another feature of the present disclosure, the drive unit may be configured to rotate the permanent magnet.

According to further another feature of the present disclosure, the magnetism flow connecting unit is made of pure iron.

According to an additional feature of the present disclosure, a surface of the magnetism flow connecting unit, which faces the carrier, may be smaller in area than a surface of the magnetism flow connecting unit, which faces the permanent magnet.

According to another additional feature of the present disclosure, the magnetism flow connecting unit may have an external appearance formed such that a thickness thereof gradually changes in a direction of the magnetism flow from the permanent magnet to the carrier.

According to still another additional feature of the present disclosure, the chip carrier exchanging device may further include a housing configured to fix the magnetism flow connecting unit and made of a material that does not generate a magnetism flow in the housing, in which the permanent magnet is disposed below the housing.

In order to solve the aforementioned object, an atomic force microscopy apparatus according to the exemplary embodiment of the present disclosure includes: an atomic force microscope including a head capable of operating at least in a Z-direction; and the chip carrier exchanging device according to claim 1, in which the head is relatively moved to the chip carrier exchanging device and a chip carrier mounted on the head is replaceable based on a user's instruction or automatically based on a state of a probe of the chip carrier mounted on the head.

According to the chip carrier exchanging device and the atomic force microscopy apparatus including the same according to the present disclosure, it is possible to miniaturize the apparatus by reducing a required load when switching between the ON state and the OFF state, and it is possible to innovatively reduce a defect rate and thus reduce production costs by using pure iron having good workability and by using a permanent magnet for a standard product.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims.

Terms "first", "second", and the like may be used to describe various constituent elements, but the constituent elements are of course not limited by these terms. These terms are merely used to distinguish one constituent element from another constituent element. Therefore, the first constituent element mentioned hereinafter may of course be the second constituent element within the technical spirit of the present disclosure. In addition, even if it is described that second coating is performed after first coating, it is obvious that the feature in which the coating is performed in the reverse order is also included in the technical spirit of the present disclosure.

In using reference numerals in the present specification, like reference numerals are used, if possible, when like configurations are illustrated even though the drawings are different.

The size and thickness of each component illustrated in the drawings are shown for ease of description, but the present disclosure is not necessarily limited to the size and thickness of the illustrated component.

Hereinafter, an exemplary embodiment of a carrier exchanging device according to the present disclosure will be described with reference to the accompanying drawings.

Figure 1:
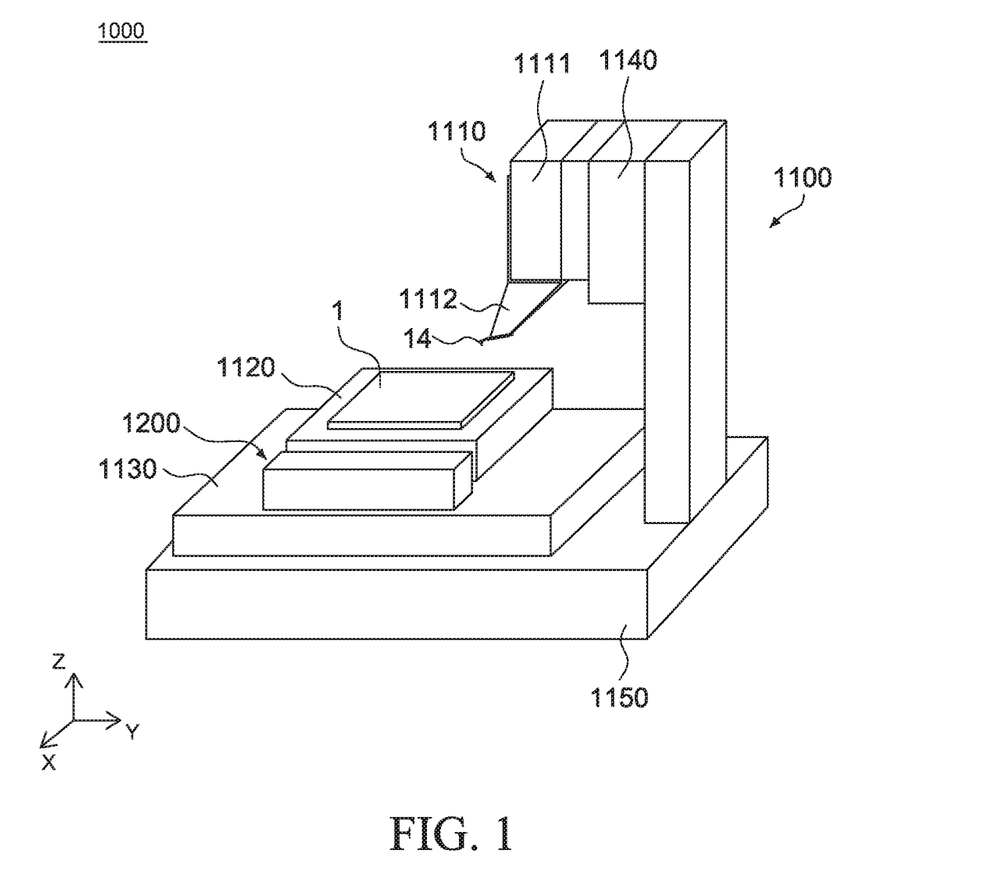
FIG. 1 is a schematic perspective view illustrating a state in which a carrier exchanging device according to the present disclosure is disposed in an atomic force microscopy apparatus.
Figure 2A:
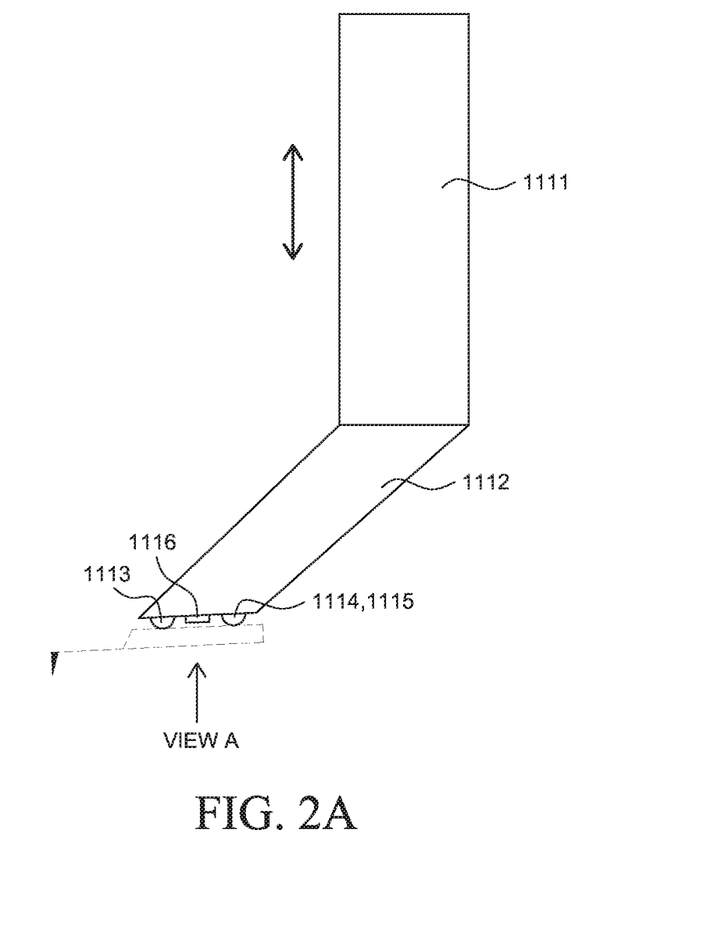
FIG. 2A is a schematic side view of a head of the atomic force microscopy apparatus in FIG. 1.
Figure 2B:
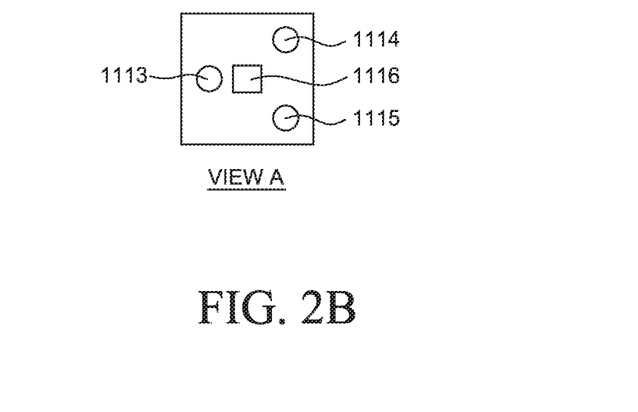
FIG. 2B is a bottom plan view of a probe hand.
Figure 3:
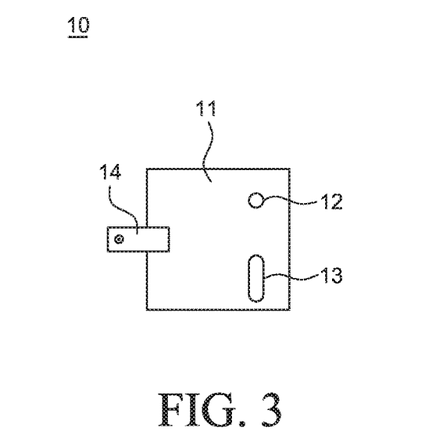
FIG. 3 is a top plan view of a chip carrier.

FIG. 1 is a schematic perspective view illustrating a state in which a carrier exchanging device according to the present disclosure is disposed in an atomic force microscopy apparatus, FIG. 2A is a schematic side view of a head of the atomic force microscopy apparatus in FIG. 1, FIG. 2B is a bottom plan view of a probe hand, and FIG. 3 is a top plan view of a chip carrier.

Referring to FIG. 1, an atomic force microscopy apparatus 1000 includes an atomic force microscope 1100 and a chip carrier exchanging device 1200.

The atomic force microscope 1100 has a configuration of a publicly-known atomic force microscope. As illustrated in FIG. 1, the atomic force microscope 1100 includes a head 1110, an XY scanner 1120, an XY stage 1130, a Z stage 1140, and a fixing frame 1150.

Referring to FIG. 2, the head 1110 includes a Z-scanner 1111 and a probe hand 1112. The Z-scanner 1111 moves the probe hand 1112 upward or downward, and a piezo-stack may be utilized as an actuator. The probe hand 1112 transmits driving power from the Z-scanner 1111 to a chip carrier 10 fixed at an end of the probe hand 1112.

The probe hand 1112 fixes the chip carrier 10. In the present exemplary embodiment, three balls 1113, 1114, and 1115 and a permanent magnet 1116 are used. A carrier 11 of the chip carrier 10 is made of a magnetic material that may be attached to the permanent magnet. Therefore, the carrier 11 may be fixed by the permanent magnet 1116.

Meanwhile, because it is not preferable that the permanent magnet 1116 and the chip carrier 10 come into contact with each other, the chip carrier 10 is spaced apart from the permanent magnet 1116 by the conductive first ball 1113 and the non-conductive second and third balls 1114 and 1115. The second and third balls 1114 and 1115 may be made of a material such as ruby or sapphire.

Referring to FIG. 3, the chip carrier 10 includes the carrier 11 and a probe (also called a cantilever) 14. The carrier 11 has a circular hole 12 in which any one of the second and third balls 1114 and 1115 is seated, and a long hole 13 in which the other of the second and third balls 1114 and 1115 is seated. The first ball 1113 comes into contact with a surface of the carrier 11.

In addition, the head 1110 may further include publicly known configurations such as a laser device and an alignment means for aligning laser beams, which are produced by the laser device, with a surface of the probe 14, but the illustration and the description of the configurations will be omitted.

Referring back to FIG. 1, the XY scanner 1120 is configured to scan a measurement subject 1 on an XY plane in an X direction and a Y direction. In addition, the XY stage 1130 is configured to move the measurement subject 1, the XY scanner 1120, and the chip carrier exchanging device 1200 in the X direction and the Y direction with the relatively large displacement.

In addition, the Z stage 1140 is configured to move the head 1110 in the Z direction with the relatively large displacement. In addition, the fixing frame 1150 is configured to fix the XY stage 1130 and the Z stage 1140.

As described above, this configuration corresponds to a configuration of a general atomic force microscope.

The chip carrier exchanging device 1200 according to the present disclosure is disposed at a position on the XY stage 1130 different from a position of the XY scanner 1120. When the probe 14 needs to be replaced, the XY stage 1130 operates to position the chip carrier exchanging device 1200 at a replacement position, and then the chip carrier exchanging device 1200 exchanges the carriers. A specific configuration of the chip carrier exchanging device 1200 will be described below.

Meanwhile, the configuration in which the piezo stack embedded in the Z-scanner 1111 to operate the probe hand only in the Z-direction has been described, but a tube scanner may be embedded to operate the probe hand in all of the X-direction, the Y-direction, and the Z-direction. Because the atomic force microscopy apparatus in FIG. 1 separately has the XY scanner 1120, the Z-scanner 1111 may be configured to be operated only in the Z direction (XY scanning and Z scanning are separated). However, the tube scanner may be embedded in the Z-scanner without a separate XY scanner, such that the probe may perform the scanning in the Z-direction as well as the direction of the XY plane.

Meanwhile, in addition to the aforementioned method, the probe hand 1112 may fix the chip carrier 10 in various ways. For example, the chip carrier may be mechanically fixed by using a clip.

The method of fixing the probe hand 1112 and the chip carrier 10, which has been described with reference to FIGS. 1 to 3, is only illustrative. That is, it should be noted that the shape of the probe hand 1112 and the shape of the chip carrier 10 may be variously modified.

Figure 4:
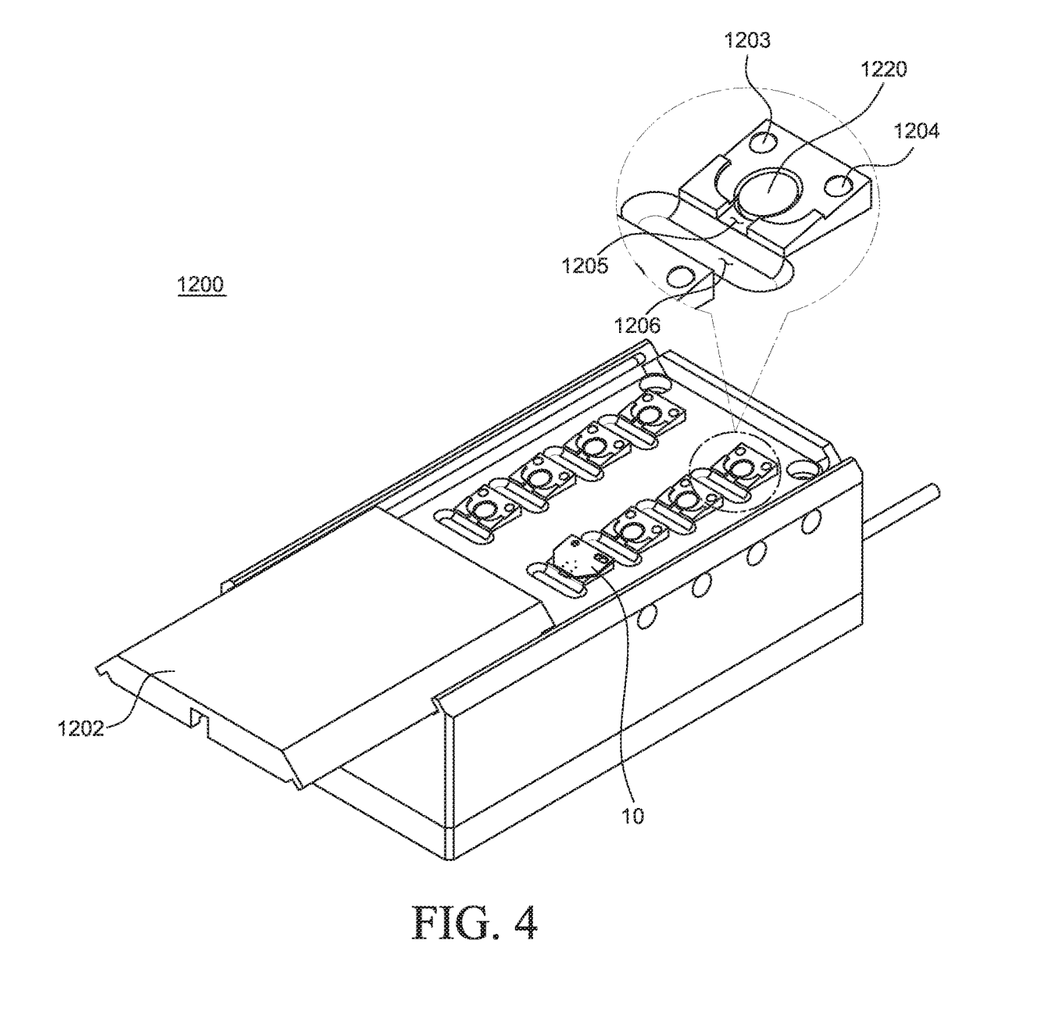
FIG. 4 is a schematic perspective view of the carrier exchanging device according to the exemplary embodiment of the present disclosure.
Figure 5:
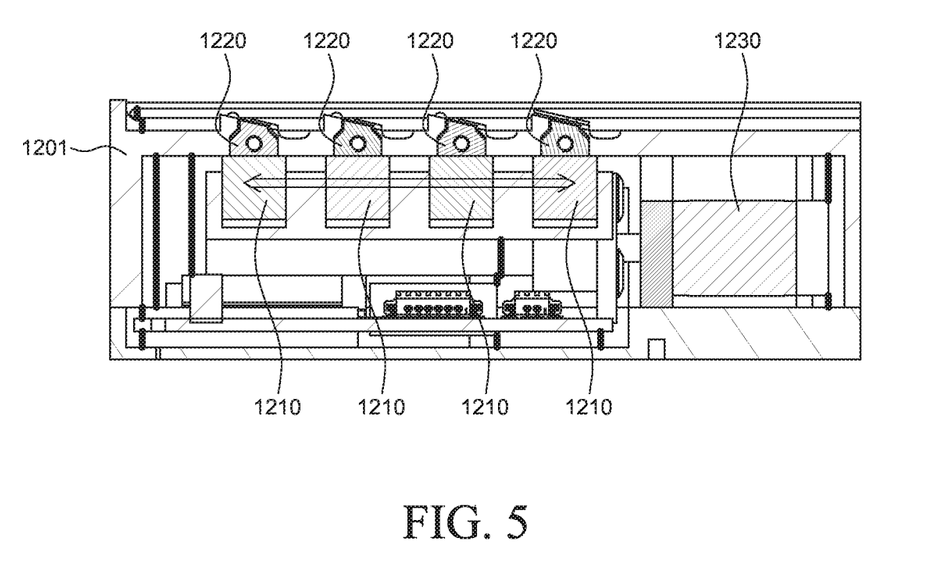
FIG. 5 is a cross-sectional side view of the carrier exchanging device in FIG. 4.
Figure 6A:
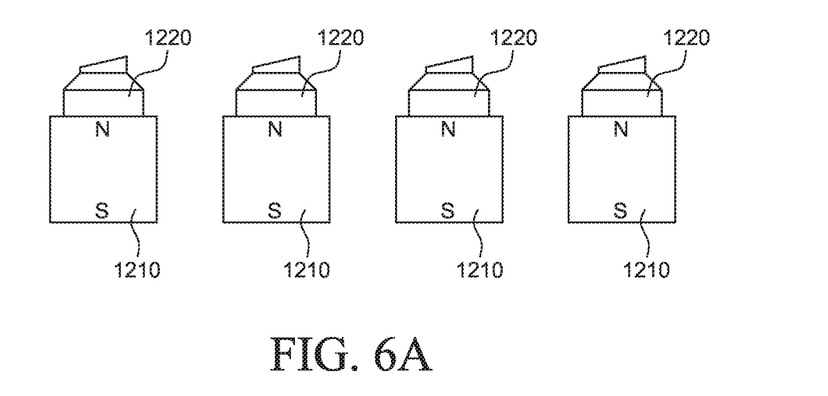
FIGS. 6A and 6B are schematic side views illustrating permanent magnets and magnetism flow generating units which are in ON and OFF states.
Figure 6B:
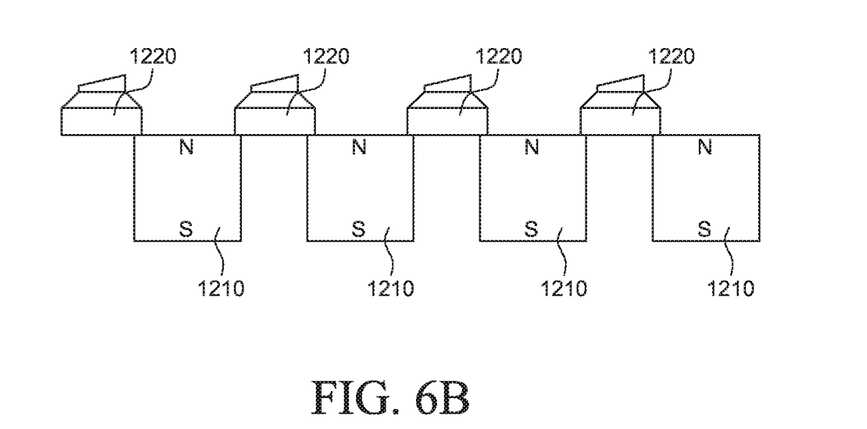

FIG. 4 is a schematic perspective view of the carrier exchanging device according to the exemplary embodiment of the present disclosure, FIG. 5 is a cross-sectional side view of the carrier exchanging device in FIG. 4, and FIGS. 6A and 6B are schematic side views illustrating permanent magnets and magnetism flow generating units which are in ON and OFF states.

Referring to FIGS. 4 to 6, the chip carrier exchanging device 1200 according to the present disclosure receives the used chip carrier 10 from the head 1110 of the scanning probe microscope (exemplified as the atomic force microscope in the present specification) that performs the measurement by using the chip carrier 10 configured such that the measurement means (the probe in the present exemplary embodiment) 14 is attached to the carrier 11 made of a magnetic material. Further, the chip carrier exchanging device 1200 supplies a new chip carrier 10 to the head 1110.

The chip carrier exchanging device 1200 according to the exemplary embodiment of the present disclosure includes permanent magnets 1210, magnetism flow connecting units 1220, and a drive unit 1230.

The permanent magnet 1210 is disposed below the magnetism flow connecting unit 1220 so that an N-pole or an S-pole is directed toward the magnetism flow connecting unit 1220.

The magnetism flow connecting unit 1220 is made of a magnetic material that allows magnetism to flow therethrough. The magnetism flow connecting unit 1220 may be configured to fix the carrier 11 by exerting a magnetic effect on the carrier 11. Pure iron is suitable as a material of the magnetism flow connecting unit 1220, but various other materials may be selected.

Meanwhile, a surface of the magnetism flow connecting unit 1220, which faces the carrier 11, may have a smaller area than a surface of the magnetism flow connecting unit 1220, which faces the permanent magnet 1210. This is because the magnetism flow from the permanent magnet 1210 may be concentrated in the direction of the carrier 11 by this configuration.

The magnetism flow connecting unit 1220 may be fixed by a housing 1201. The housing 1201 defines an outer surface of the apparatus 1200. In particular, referring to FIG. 4, the magnetism flow connecting unit 1220 is configured such that only an end thereof is exposed to the outside, and balls 1203 and 1204 are disposed to prevent the magnetism flow connecting unit 1220 and the carrier 11 from coming into direct contact with each other. The balls 1203 and 1204 may be made of the same material of the second ball 1114 or the third ball 1115 at the end of the probe hand 1112. In addition, a first seating groove 1205 and a second seating groove 1206, in which the probe 14 is seated when storing the chip carrier 10, may be formed.

Since the circular hole 12 and the long hole 13 are seated on the balls 1203 and 1204, respectively, when storing the chip carrier 10, the position of the chip carrier 10 may be determined, and the probe 14 may be maintained, without damage, by the first seating groove 1205 and the second seating groove 1206 when the probe 14 is seated.

The drive unit 1230 operates the permanent magnet 1210, thereby changing magnetic force between the carrier 11 and the magnetism flow connecting unit 1220. The drive unit 1230 may rectilinearly move the permanent magnet 1210 as described in the present exemplary embodiment, and the drive unit 1230 may rotate the permanent magnet 1210.

In particular, referring to FIG. 6, the drive unit 1230 rectilinearly operates the permanent magnet 1210 between an ON state and an OFF state. As illustrated in FIG. 6A, in the ON state, as the permanent magnet 1210 faces the magnetism flow connecting unit 1220, the magnetism flow generated from the permanent magnet 1210 is transmitted to the carrier 11. As illustrated in FIG. 6B, the OFF state means a state in which the permanent magnet 1210 and the magnetism flow connecting unit 1220 are most distant from each other, and the OFF state includes not only a state in which the permanent magnet 1210 and the magnetism flow connecting unit 1220 do not face each other at all, but also a state in which the permanent magnet 1210 and the magnetism flow connecting unit 1220 partially face each other. The "state in which the permanent magnet 1210 and the magnetism flow connecting unit 1220 are most distant from each other" includes a state in which the magnetism flow passing through the magnetism flow connecting unit 1220 deteriorates because a center of the permanent magnet 1210 and a center of the magnetism flow connecting unit 1220 are not coincide with each other, that is, a state deviating from the state (ON state) in which the center of the permanent magnet 1210 and the center of the magnetism flow connecting unit 1220 are coincide with each other. As a distance between the permanent magnet 1210 and the magnetism flow connecting unit 1220 is increased, the magnetic force applied to the carrier 11 rapidly deteriorates (in proportion to the square of the distance), and a state in which the permanent magnet 1210 is spaced apart from the magnetism flow connecting unit 1220 to a degree to which the carrier 11 may be separated may be referred to as the OFF state. That is, it should be noted that the OFF state is not a state that prevents the magnetic force from being applied to the carrier 11 at all.

Meanwhile, even in the OFF state, the magnetism flow connecting unit 1220 partially faces the permanent magnet 1210, as illustrated in FIG. 6, such that when low attractive force is applied to the carrier 11, it is possible to prevent the withdrawal of the carrier 11 which is caused by unexpected impact or external magnetic force that may occur in the OFF state before the carrier 11 is transferred to the probe hand 1112.

A motor may be used in the case in which the drive unit 1230 rectilinearly operates the permanent magnet 1210 as described in the present exemplary embodiment. A rotational motion generated by the motor may be converted into a rectilinear motion by a lead screw or the like. In addition, various methods using a hydraulic cylinder, a linear motor, or the like may be applied to the drive unit 1230.

In the present exemplary embodiment, the magnetism flow connecting units 1220 and the permanent magnets 1210 are disposed in a row in order to control the operation of fixing the plurality of chip carriers 10. The drive unit 1230 rectilinearly moves the permanent magnets 1210 in the direction in which the permanent magnets 1210 are disposed. Alternatively, the drive unit 1230 may move the permanent magnets 1210 upward or downward. The magnetic force may be controlled with respect to the carrier 11 even by moving the permanent magnet 1210 upward or downward. However, this arrangement has a disadvantage in that a thickness of the apparatus 1200 is increased, and higher force is required to move the permanent magnet 1210, which increases a requirement of the drive unit 1230. However, this modification may be sufficiently applied if it does not matter if the apparatus is thickened and the intensity of the drive unit 1230 is increased.

Meanwhile, a cover 1202 may be provided to be slidably coupled to the housing 1201. When not in operation, the cover 1202 may cover the stored chip carriers 10, thereby safely protecting the chip carriers 10.

Figure 7A:
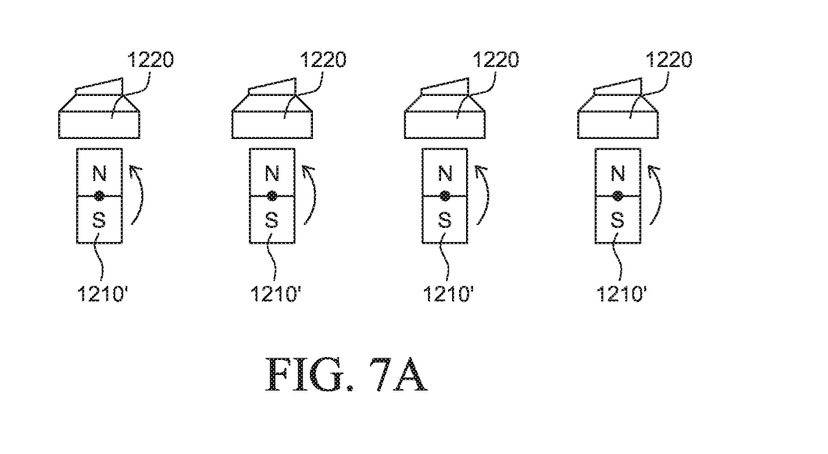
FIGS. 7A and 7B are side views illustrating the carrier exchanging device including a drive unit according to another exemplary embodiment.
Figure 7B:
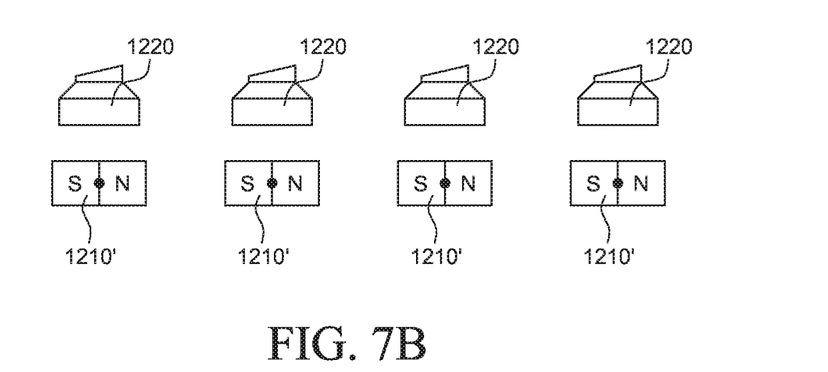

FIGS. 7A and 7B are side views illustrating the carrier exchanging device including a drive unit according to another exemplary embodiment.

Referring to FIG. 7, a drive unit (not illustrated) may control the ON state and the OFF state by rotating permanent magnets 1210'. In the ON state (the state illustrated in FIG. 7A), the N-pole or the S-pole of the permanent magnet 1210' faces the magnetism flow connecting unit 1220. In the OFF state (the state illustrated in FIG. 7B), no pole of the permanent magnet 1210' faces the magnetism flow connecting unit 1220.

Figure 8A:
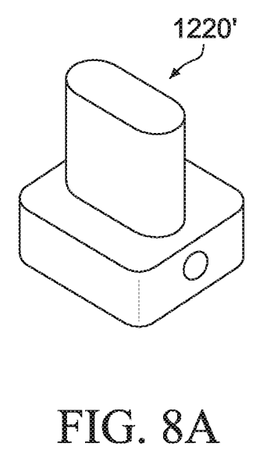
FIGS. 8A to 8C are schematic perspective views illustrating magnetism flow connecting units according to various modified embodiments.
Figure 8B:
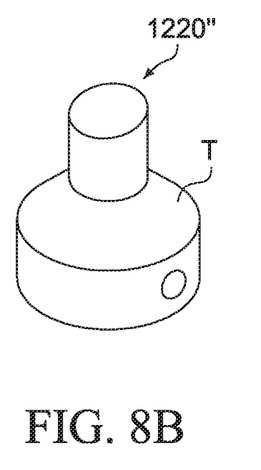
Figure 8C:
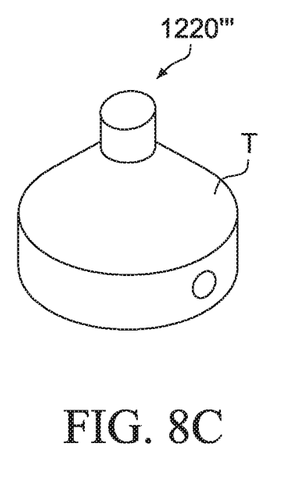

FIGS. 8A to 8C are schematic perspective views illustrating magnetism flow connecting units according to various modified embodiments.

As illustrated in FIGS. 8A to 8C, magnetism flow connecting units 1220', 1220", and 1220'" may be formed in various forms and used. The magnetism flow connecting units 1220', 1220", and 1220'" are made of pure iron having good workability, such that it is possible to obtain higher precision in comparison with a case in which a permanent magnet is machined. Therefore, there is an advantage in that an interval from the carrier 11 may be precisely adjusted.

As described above, commonly, a surface (a lower surface in FIG. 8) of each of the magnetism flow connecting units 1220', 1220", and 1220'", which faces the permanent magnet 1210 or 1210', may be larger than a surface (an upper surface in FIG. 8) of each of the magnetism flow connecting units 1220', 1220", and 1220'", which faces the carrier 11, such that the magnetic force is concentrated in the direction of the carrier 11.

Each of the magnetism flow connecting units 1220', 1220", and 1220'" may be configured such that an angled portion is present between the surface facing the permanent magnet 1210 and the surface facing the carrier 11, as illustrated in FIG. 8A, or a portion T, which gradually changes in thickness, is present between the surface facing the permanent magnet 1210 and the surface facing the carrier 11, as illustrated in FIGS. 8B and 8C.

When the angled portion is present as illustrated in FIG. 8A, the magnetic flow from the permanent magnet 1210 is not completely transmitted to the carrier 11, and a loss of magnetism occurs. Therefore, in order to transmit the magnetic flow from the permanent magnet 1210 with better efficiency, the magnetism flow connecting unit may have an external appearance such that the thickness thereof gradually changes in the direction of the magnetism flow from the permanent magnet 1210 to the carrier 11, as illustrated in FIGS. 8B and 8C.

The surface facing the carrier 11 may be larger than the surface facing the permanent magnet 1210, as illustrated in FIG. 8B, or the surface facing the carrier 11 may be smaller than the surface facing the permanent magnet 1210, as illustrated in FIG. 8C. This ratio may be determined appropriately based on design specifications.

According to the chip carrier exchanging device 1200 and the atomic force microscopy apparatus 1000 including the same, it is possible to miniaturize the apparatus by reducing a required load when switching between the ON state and the OFF state, and it is possible to innovatively reduce a defect rate and thus reduce production costs by using pure iron having good workability and by using a permanent magnet for a standard product.

While the exemplary embodiments of the present disclosure have been described with reference to the accompanying drawings, those skilled in the art will understand that the present disclosure may be carried out in any other specific form without changing the technical spirit or an essential feature thereof. Therefore, it should be understood that the above-described exemplary embodiments are illustrative in all aspects and do not limit the present application.

What is claimed is:

1. A chip carrier exchanging device which receives a used chip carrier from a head of a scanning probe microscope that performs measurement by using the chip carrier configured such that a measurement means is attached to a carrier made of a magnetic material, the chip carrier exchanging device being configured to supply a new chip carrier to the head, the chip carrier exchanging device comprising:
   a permanent magnet;
   a magnetism flow connecting unit made of a magnetic material that allow magnetism to flow therethrough, the magnetism flow connecting unit being configured to fix the chip carrier by exerting a magnetic effect on the carrier; and
   a drive unit configured to operate the permanent magnet to change magnetic force between the carrier and the magnetism flow connecting unit,
   wherein the plurality of magnetism flow connecting units and the plurality of permanent magnets are arranged, and the drive unit is configured to rectilinearly operate the permanent magnets in a direction in which the magnetism flow connecting units are arranged and, wherein the plurality of permanent magnets are moved between an on-state in which the centers of the permanent magnets and the centers of the magnetism flow connecting units are coincide with each other and off-state in which the centers of the permanent magnets and the center of the magnetism flow connecting unit are not coincide with each other.

2. The chip carrier exchanging device of claim 1, wherein the drive unit is controlled such that the permanent magnets are rectilinearly operated between an ON state in which the permanent magnets face the magnetism flow connecting units and an OFF state in which the permanent magnets are most distant from the magnetism flow connecting units.

3. The chip carrier exchanging device of claim 1, wherein the drive unit is configured to rotate the permanent magnet.

4. The chip carrier exchanging device of claim 1, wherein the magnetism flow connecting unit is made of pure iron.

5. The chip carrier exchanging device of claim 1, wherein a surface of the magnetism flow connecting unit, which faces the carrier, is smaller in area than a surface of the magnetism flow connecting unit, which faces the permanent magnet.

6. The chip carrier exchanging device of claim 5, wherein the magnetism flow connecting unit has an external appearance formed such that a thickness thereof gradually changes in a direction of a magnetism flow from the permanent magnet to the carrier.

7. The chip carrier exchanging device of claim 1, further comprising:
a housing configured to fix the magnetism flow connecting unit and made of a material that does not generate a magnetism flow in the housing,
wherein the permanent magnet is disposed below the housing.

8. An atomic force microscopy apparatus comprising:
an atomic force microscope comprising a head capable of operating at least in a Z-direction; and
the chip carrier exchanging device according to claim 1,
wherein the head is relatively moved to the chip carrier exchanging device and a chip carrier mounted on the head is replaceable based on a user's instruction or automatically based on a state of a probe of the chip carrier mounted on the head.

\* \* \* \* \*